(12) United States Patent
Lee et al.

(10) Patent No.: US 9,014,899 B2
(45) Date of Patent: Apr. 21, 2015

(54) METHOD AND SYSTEM FOR CONTROLLING DOWNSHIFT FOR HYBRID VEHICLE

(71) Applicant: Hyundai Motor Company, Seoul (KR)

(72) Inventors: Soo Bang Lee, Whasung-Si (KR); Tai Jin Jung, Whasung-Si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/135,536

(22) Filed: Dec. 19, 2013

(65) Prior Publication Data

US 2015/0088348 A1 Mar. 26, 2015

(30) Foreign Application Priority Data

Sep. 23, 2013 (KR) .................. 10-2013-0112834

(51) Int. Cl.
*B60W 20/00* (2006.01)
*B60W 10/11* (2012.01)

(52) U.S. Cl.
CPC ............... *B60W 20/40* (2013.01); *B60W 10/11* (2013.01); *Y10S 903/902* (2013.01)

(58) Field of Classification Search
USPC .......................................................... 701/22
See application file for complete search history.

(56) References Cited

U.S. PATENT DOCUMENTS

| | | | | |
|---|---|---|---|---|
| 7,351,183 B2* | 4/2008 | Fujii et al. | ...................... | 477/109 |
| 7,503,875 B2* | 3/2009 | Fujii et al. | ...................... | 477/107 |
| 8,061,463 B2* | 11/2011 | Kitano et al. | ............ | 180/65.285 |
| 8,544,577 B2* | 10/2013 | Kitano et al. | ............ | 180/65.285 |
| 8,762,011 B2* | 6/2014 | Ishida et al. | ...................... | 701/51 |
| 2004/0043863 A1* | 3/2004 | Kondo et al. | ...................... | 477/38 |
| 2006/0108163 A1* | 5/2006 | Kitano et al. | ................ | 180/65.2 |
| 2009/0277704 A1* | 11/2009 | Yamaguchi | ................ | 180/65.31 |
| 2012/0244993 A1* | 9/2012 | Ishida et al. | ...................... | 477/39 |
| 2013/0231815 A1* | 9/2013 | Tanishima et al. | ............... | 701/22 |

FOREIGN PATENT DOCUMENTS

| | | |
|---|---|---|
| JP | 2001-88586 A | 4/2001 |
| JP | 2005-162175 A | 6/2005 |
| JP | 2010-188786 A | 9/2010 |
| JP | 2012-106711 A | 6/2012 |
| KR | 10-2011-0048690 A | 5/2011 |
| KR | 10-2012-0021093 A | 3/2012 |
| KR | 10-2012-0021094 A | 3/2012 |

* cited by examiner

*Primary Examiner* — Thomas Tarcza
*Assistant Examiner* — Alex C Dunn
(74) *Attorney, Agent, or Firm* — Morgan, Lewis & Bockius LLP (57) ABSTRACT

A method and system for controlling a downshift for a hybrid vehicle includes: determining whether a running mode of the hybrid vehicle is an electric vehicle (EV) mode; determining whether a kick-down occurs when the hybrid vehicle is in the EV mode, wherein the kick-down requires a downshift; operating an engine and performing a shift-start (SS) when a downshift condition according to the kick-down is satisfied; determining whether a speed of the engine and a speed of a motor are synchronized before performing an actual shift-begin (SB); engaging an engine clutch when the speed of the engine and the speed of the motor are synchronized; and performing the actual SB when the engine clutch is engaged.

5 Claims, 8 Drawing Sheets

METHOD AND SYSTEM FOR CONTROLLING DOWNSHIFT FOR HYBRID VEHICLE

CROSS-REFERENCE TO RELATED APPLICATION

The present application claims priority of Korean Patent Application Number 10-2013-0112834 filed Sep. 23, 2013, the entire contents of which application is incorporated herein for all purposes by this reference.

BACKGROUND OF INVENTION

1. Field of Invention

The present invention relates to a method and system for controlling a downshift for a hybrid vehicle. More particularly, the present invention relates to a method and system for controlling a downshift for a hybrid vehicle that performs an operation of a downshift along with an operation of engagement of an engine clutch installed between an engine and a motor when a downshift is required in response to a kick-down while a hybrid vehicle runs in an electric vehicle (EV) mode, thereby reducing a feeling of acceleration delay and improving acceleration linearity.

2. Description of Related Art

Hybrid electric vehicles operate using power from an internal combustion engine and power from a battery. In particular, hybrid vehicles are designed to efficiently combine and use power of the internal combustion engine and the motor.

Figure 1:
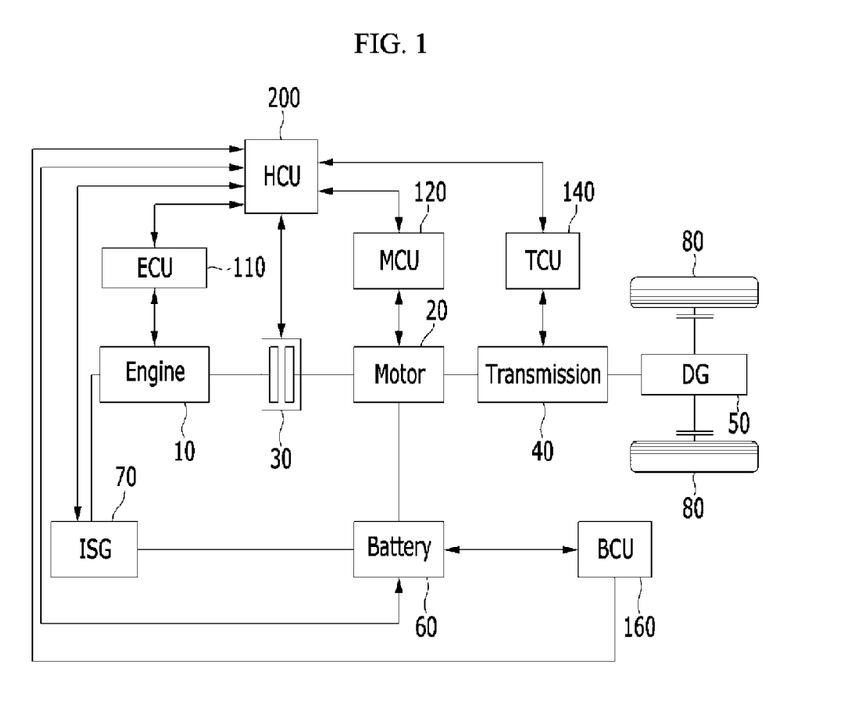
FIG. 1 is a block diagram for schematically showing a typical hybrid vehicle.

For example, as illustrated in FIG. 1, a hybrid vehicle includes an engine 10, a motor 20, an engine clutch 30, a transmission 40, a differential gear unit 50, a battery 60, an integrated starter-generator (ISG) 70, and wheels 80. The engine clutch 30 controls power transmission between the engine 10 and the motor 20, and the integrated starter-generator (ISG) 70 starts the engine 10 or generates electric power by an output torque of the engine 10.

As shown in FIG. 1, in case the engine clutch 30 is installed between the engine 10 and the motor 20, since the motor 20 is typically mounted on a transmission, the hybrid vehicle shown in FIG. 1 is referred to as a transmission electric device (TMED) type of hybrid vehicle.

As also shown in FIG. 1, the hybrid vehicle further includes: a hybrid control unit (HCU) 200 which controls overall operation of the hybrid electric vehicle; an engine control unit (ECU) 110 which controls operation of the engine 10; a motor control unit (MCU) 120 which controls operation of the motor 20; a transmission control unit (TCU) 140 which controls operation of the transmission 40; and a battery control unit (BCU) 160 which manages and controls the battery 60.

The battery control unit 160 may also be referred to as a battery management system (BMS). The integrated starter-generator 70 may also be referred to as a starting/generating motor or a hybrid starter-generator.

The hybrid vehicle may run in a driving mode such as an electric vehicle (EV) mode using only power of the motor 20, a hybrid electric vehicle (HEV) mode using torque of the engine 10 as the main power and torque of the motor 20 as auxiliary power, and a regenerative braking (RB) mode during braking or when the vehicle runs by inertia. In the RB mode, braking and inertia energy are collected through power generation of the motor 20, and the battery 60 is charged with the collected energy.

In case the hybrid vehicle is a TMED type in which an automatic transmission and/or a DCT are installed, when a driver's demand torque suddenly increases (for example, a kick-down occurs) while the hybrid vehicle runs in an electric vehicle (EV) mode, downshift control may be performed. The downshift control is control that changes the current gear shift stage to a lower gear shift stage.

Engagement of the engine clutch is required to perform the downshift control.

While the downshift control (or operation) is performed, engaging the engine clutch along with shifting is preferred. In the related art, however, because of complexity of shifting control and controlling the engine clutch, a shift operation is performed after engaging the engine clutch or an engagement operation of the engine clutch is performed after shifting, thus it is difficult to satisfy a driver's acceleration demand and/or demand torque.

Figure 2:
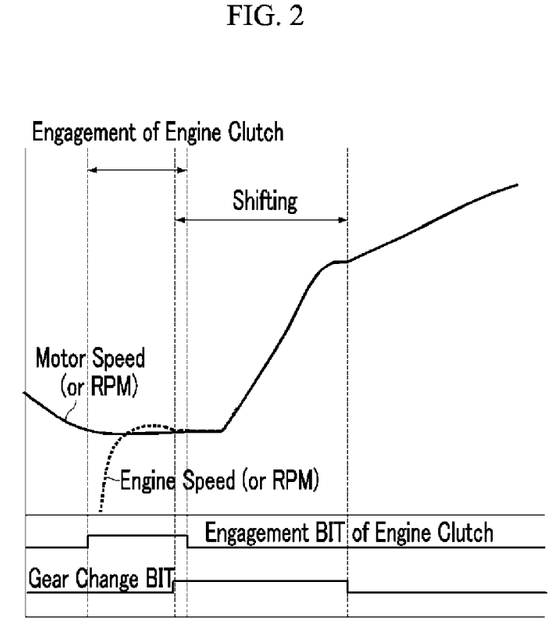
FIG. 2 and FIG. 3 are graphs for explaining a downshift control method for a TMED type of hybrid vehicle in which an automatic transmission or a DCT is installed.
Figure 3:
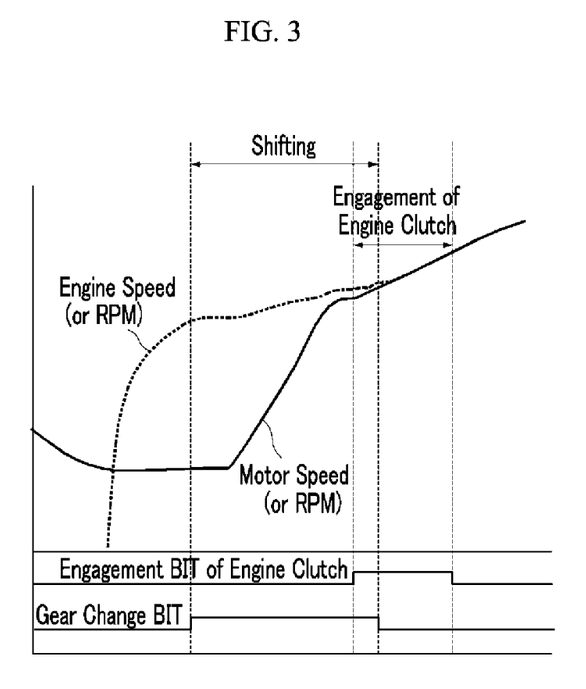

FIG. 2 is a graph for showing a method of performing shift operation after engaging an engine clutch, and FIG. 3 is a graph for showing a method of performing an engagement operation of an engine clutch after shifting.

As shown in FIGS. 2 and 3, when shifting control and engagement control of the engine clutch are independently performed, it may be easy to improve drivability since problems related to the shifting control and the engagement control of the engine clutch are not overlapped. However, in case of performing the shifting control and the engagement control of the engine clutch independently, acceleration performance may deteriorate since it takes a considerable time to satisfy a driver's acceleration demand and/or demand torque.

As shown in FIG. 2, the method of performing the shift operation after engaging the engine clutch may obtain linear acceleration performance after shifting, but a torque applied to a wheel may be increased slowly because of performing the shift operation after engaging the engine clutch.

As shown in FIG. 3, since the method of performing the engagement operation of the engine clutch after shifting first performs the shifting, a torque applied to a wheel may be rapidly increased. However, since the torque applied to the wheel is sufficiently generated after the engagement of the engine clutch, a difference between torques applied to the wheel occurs, thus acceleration linearity may deteriorate.

The information disclosed in this Background section is only for enhancement of understanding of the general background of the invention and should not be taken as an acknowledgement or any form of suggestion that this information forms the prior art already known to a person skilled in the art.

BRIEF SUMMARY

Various aspects of the present invention provide for a method and system for controlling a downshift for a hybrid vehicle having advantages of performing an operation of a downshift along with an operation of engagement of an engine clutch installed between an engine and a motor when a downshift is required in response to a kick-down while a hybrid vehicle runs in an electric vehicle (EV) mode, thereby reducing a feeling of acceleration delay and improving acceleration linearity.

Various aspects of the present invention provide for a method of controlling a downshift for a hybrid vehicle, including: determining whether a running mode of the hybrid vehicle is an electric vehicle (EV) mode; determining whether a kick-down occurs when the hybrid vehicle is in the EV mode, wherein the kick-down requires a downshift; operating an engine and performing a shift-start (SS) when a downshift condition according to the kick-down is satisfied; determining whether a speed of the engine and a speed of a motor are synchronized before performing an actual shift-begin (SB); engaging an engine clutch when the speed of the engine and the speed of the motor are synchronized; and performing the actual SB when the engine clutch is engaged.

The method may further include compensating a release hydraulic pressure for shifting between the SS and the actual SB based on an engagement hydraulic pressure of the engine clutch, the motor speed, and a slope of the motor speed.

The compensating of the release hydraulic pressure may be performed after the engine speed and the motor speed are synchronized.

Various aspects of the present invention provide for a method of controlling a downshift for a hybrid vehicle, including: determining whether a running mode of the hybrid vehicle is an electric vehicle (EV) mode; determining whether a kick-down occurs when the hybrid vehicle is in the EV mode, wherein the kick-down requires a downshift; operating an engine and performing a shift-start (SS) and an actual shift begin (SB) when a downshift condition according to the kick-down is satisfied; determining whether a speed of the engine and a speed of a motor are synchronized during the actual SB; engaging an engine clutch when the speed of the engine and the speed of the motor are synchronized; and performing actual shifting to terminate an operation of the downshift when the engine clutch is engaged.

The method may further include setting a target speed of the engine based on the motor speed and a slope of the motor speed during the actual SB.

The method may further include compensating a release hydraulic pressure for operation of the downshift based on an engagement hydraulic pressure of the engine clutch, the motor speed, and a slope of the motor speed.

The compensating of the release hydraulic pressure may be performed after the engine speed and the motor speed are synchronized.

Various aspects of the present invention provide for a system for controlling a downshift for a hybrid vehicle, including: an engine clutch configured to control power transmission between an engine and a motor; an engine control unit (ECU) configured to control an operation of the engine; a motor control unit (MCU) configured to control an operation of the motor; a transmission control unit (TCU) configured to control an operation of a transmission; and a controller configured to control an operation of a downshift in response to a kick-down while the hybrid vehicle runs in an electric vehicle (EV) mode, wherein the controller may be operated by a program set for performing at least one of the methods of controlling the downshift for the hybrid vehicle according to various aspects of the present invention.

According to various aspects of the present invention, it is possible to perform an operation of a downshift along with an operation of an engagement of an engine clutch installed between an engine and a motor when a downshift is required in response to a kick-down while a TMED type of hybrid vehicle runs in an electric vehicle (EV) mode, thereby reducing a feeling of acceleration delay and improving acceleration linearity.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

In the specification, unless explicitly described to the contrary, the word "comprise" and variations such as "comprises" or "comprising" will be understood to imply the inclusion of stated elements but not the exclusion of any other elements.

Like reference numerals designate like elements throughout the specification.

Figure 4:
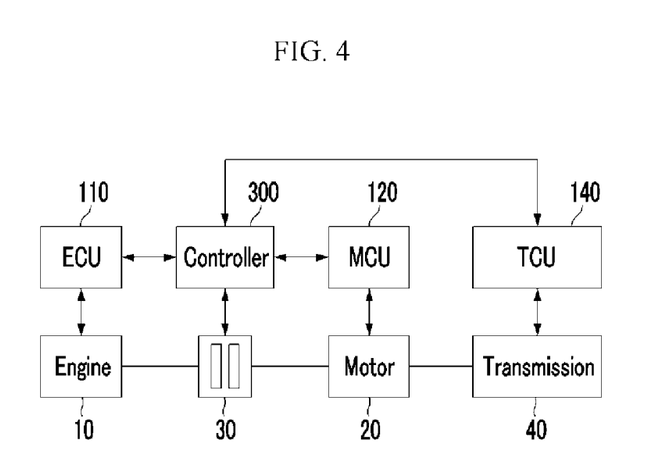
FIG. 4 is a block diagram for showing an exemplary downshift control system for a hybrid vehicle according to the present invention.

FIG. 4 is a block diagram for showing a downshift control system for a hybrid vehicle according to various embodiments of the present invention.

The downshift control system according to various embodiments of the present invention is a system that controls an operation of a downshift in response to a kick-down, for example, while a TMED type of hybrid vehicle with an automatic transmission or a DCE runs in an electric vehicle (EV) mode.

The downshift control system may include an engine clutch 30, an engine control unit (ECU) 110, a motor control unit (MCU) 120, a transmission control unit (TCU) 140, and a controller 300. The engine clutch 30 may control power transmission between an engine and a motor, the ECU 110 may control an operation of the engine, the MCU 120 may control an operation of the motor, the TCU may control an operation of a transmission, and the controller 300 controls an operation of a downshift in response to a kick-down while the hybrid vehicle runs in an electric vehicle (EV) mode.

The engine 10, the motor 20, the engine clutch 30, the transmission 40, the ECU 110, the MCU 120, and the TCU 140 may be elements corresponding to those installed in a typical TMED type of hybrid vehicle as illustrated in FIG. 1.

The controller 300 may include one or more processors or microprocessors and/or hardware operated by a predetermined program including a series of commands for executing a downshift control method for a hybrid vehicle according to various embodiments of the present invention, which will be described below.

In various embodiments of the present invention, the controller 300 may perform an operation of the HCU illustrated in FIG. 1. In other words, the controller 300 may include the HCU, or be included in the HCU.

Hereinafter, a downshift control method for a hybrid vehicle according to various embodiments of the present invention will be described in detail with reference to the accompanying drawings.

Figure 5:
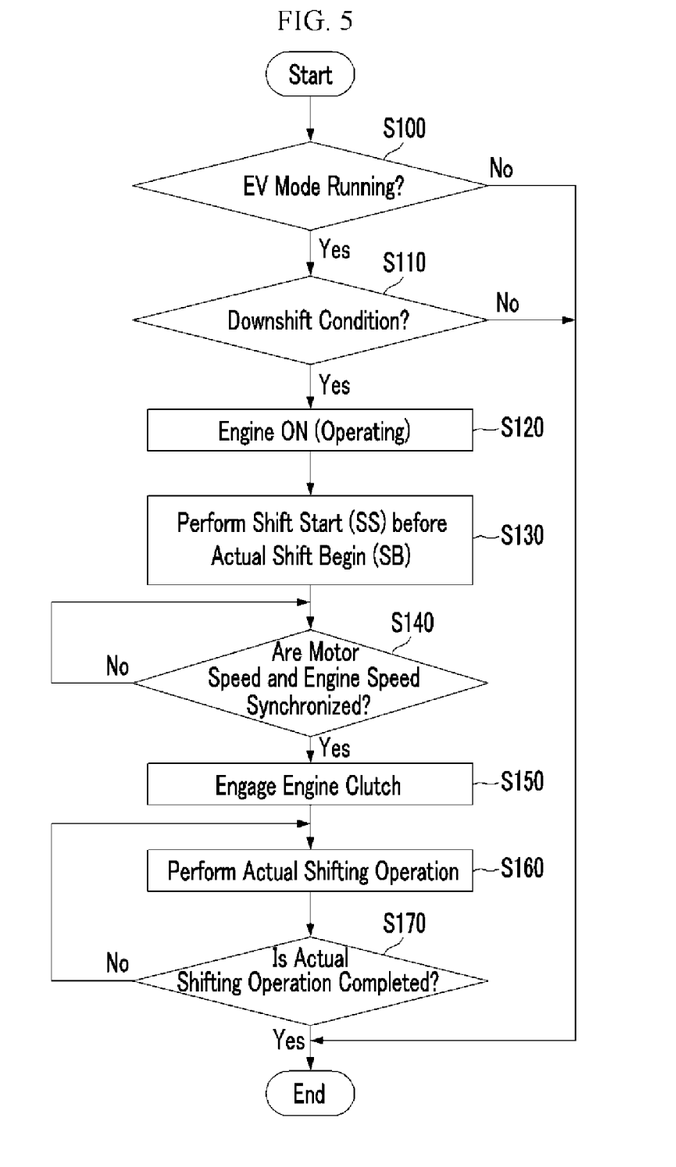
FIG. 5 is a flowchart for showing an exemplary downshift control method for a hybrid vehicle according to the present invention.

FIG. 5 is a flowchart for showing a downshift control method for a hybrid vehicle according to various embodiments of the present invention.

As shown in FIG. 5, the controller 300 determines whether a hybrid vehicle is running in an EV mode at step S100. The controller 300 may determine whether the hybrid vehicle is running in the EV mode using an algorithm for determining running modes generally applied to a typical hybrid vehicle.

When the hybrid vehicle is running in the EV mode, the controller 300 determines whether a downshift condition according to a kick-down is satisfied at step S110. The downshift condition may be determined using a downshift condition determination algorithm applied to the related art for a hybrid vehicle.

When the hybrid vehicle is running in other modes except for the EV mode such as an HEV mode or an RB mode at step S100, the controller 300 may control a downshift in the same way as that performed in the related art associated with the HEV mode.

When the shift condition is satisfied at step S110, the controller 300 operates the engine 10 at step S120. The controller 300 may operate and/or control the engine 10 through the ECU 110.

Figure 7:
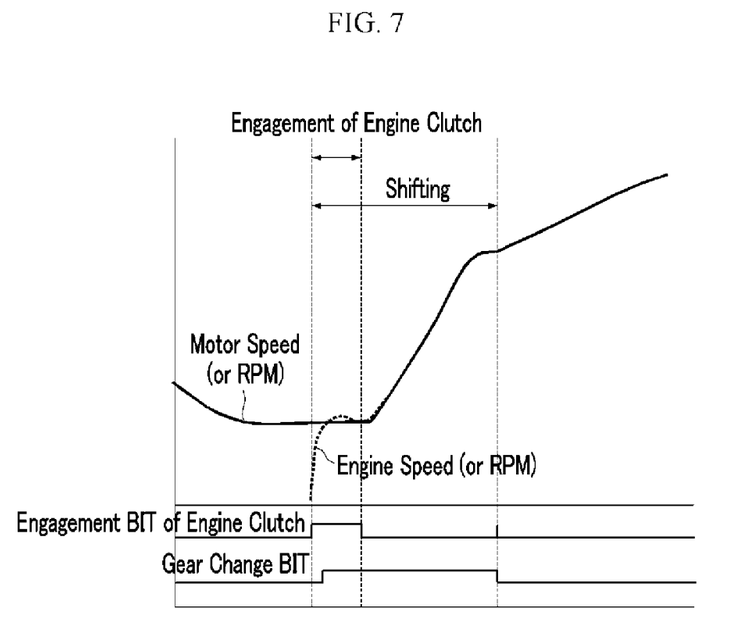
FIG. 7 and FIG. 8 are graphs for explaining an exemplary downshift control method and system for a hybrid vehicle according to the present invention.

When the engine 10 is operated, namely the engine is in an ON state, the controller 300 outputs a gear change BIT as shown in FIG. 7 so that the TCU 140 may perform a shift start (SS) operation at step S130. The term "shift start (SS)" is defined as a shift start stage in which a physical shift is not performed, which is apparent to those skilled in the art.

When the SS is performed, the controller 300 determines whether a speed of the engine 10 and a speed of the motor 20 are synchronized before an actual shift-begin (SB) is performed at step S140. When the speed of the engine 10 and the speed of the motor 20 are synchronized, the controller 300 outputs an engagement BIT of the engine clutch 30 as shown in FIG. 7 to engage the engine clutch 30 at step S150. The determining whether the speed of the engine and the speed of the motor are synchronized may be performed through an algorithm that determines whether a speed of an engine and a speed of a motor are synchronized in the related art.

The controller 300 may control the TCU 140 so that the actual SB may not be performed until the engine clutch 30 is completely engaged.

When the engine clutch 30 is engaged, the controller 300 performs the actual SB through the TCU 140, thereby completely accomplishing the operation of the downshift at step S160 and step S170.

Accordingly, according to various embodiments of the present invention, it is possible to engage the engine clutch before performing the actual SB according to the kick-down while the hybrid vehicle is running in the EV mode.

In the meantime, when supplying the engine clutch 30 with hydraulic pressure to engage the engine clutch 30, the hydraulic pressure for engaging the engine clutch 30 and inertia of the engine have a negative influence on the downshift. Accordingly, the controller 300 may compensate a release hydraulic pressure for the shifting between the SS and the SB based on the engagement hydraulic pressure of the engine clutch, the motor speed, and a slope of the motor speed. In this case, the controller 300 may compensate the release hydraulic pressure after the engine speed and the motor speed are synchronized.

Figure 6:
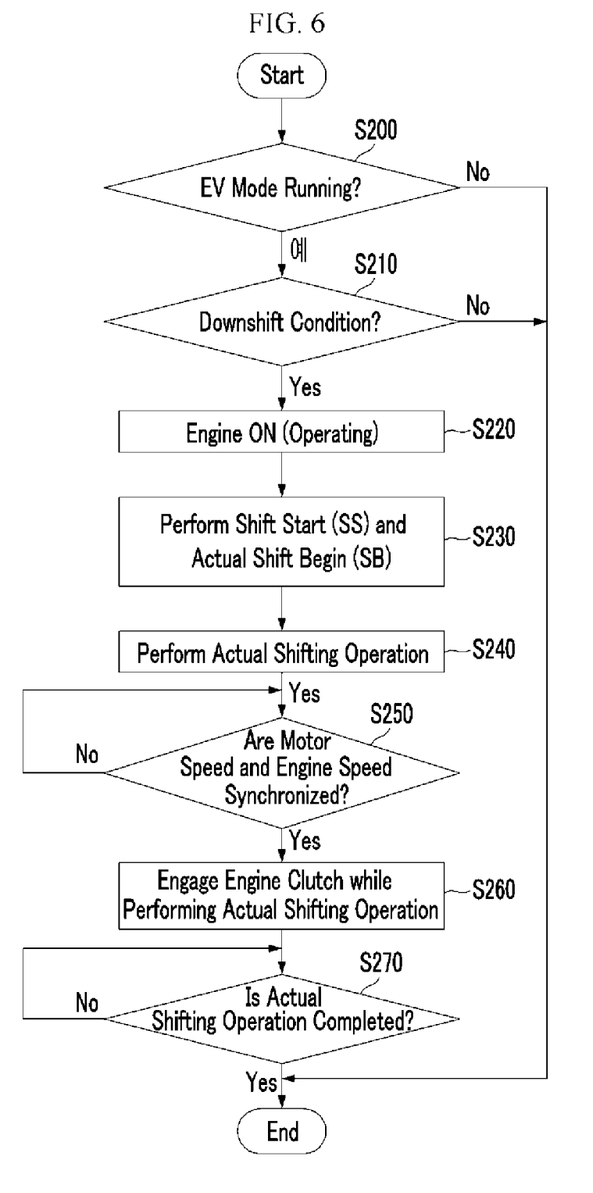
FIG. 6 is a flowchart for showing an exemplary downshift control method for a hybrid vehicle according to the present invention.

FIG. 6 is a flowchart for showing a downshift control method for a hybrid vehicle according to various embodiments of the present invention.

As shown in FIG. 6, the controller 300 determines whether a hybrid vehicle is running in an EV mode at step S200. The controller 300 may determine whether the hybrid vehicle is running in the EV mode using an algorithm for determining running modes generally applied to a typical hybrid vehicle.

When the hybrid vehicle is running in the EV mode, the controller 300 determines whether a downshift condition according to a kick-down is satisfied at step S210. The downshift condition may be determined using a downshift condition determination algorithm applied to the related art for a hybrid vehicle.

When the hybrid vehicle is running in other modes except for the EV mode such as an HEV mode or an RB mode at step S200, the controller 300 may control a downshift in the same way as that performed in the related art associated with the HEV mode.

When the shift condition is satisfied at step S210, the controller 300 operates the engine 10 at step S220. The controller 300 may operate and/or control the engine 10 through the ECU 110.

Figure 8:
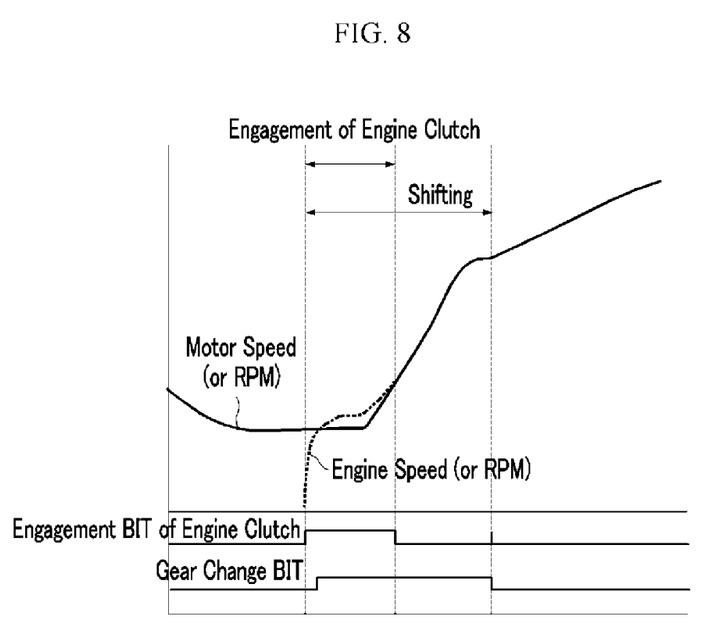

When the engine 10 is operated, namely the engine is in an ON state, the controller 300 outputs a gear change BIT as shown in FIG. 8 so that the TCU 140 may perform a shift begin (SB) operation as well as a shift start (SS) operation at step S230 and step S240. The term "shift start (SS)" is defined as a shift start stage in which a physical shift is not performed, and the term "shift begin (SB)" is defined as an actual shift begin stage when a physical shift is actually performed, which are apparent to those skilled in the art.

When the SB is performed, the controller 300, as shown in FIG. 8, determines whether a speed of the engine 10 and a speed of a motor 20 are synchronized while shifting at step S250. When the speed of the engine 10 and the speed of the motor 20 are synchronized, the controller 300 outputs an engagement BIT of the engine clutch 30 as shown in FIG. 8 to engage the engine clutch 30 at step S260.

The controller 300 may control the TCU 140 so that the SB may not be completed until the engine clutch 30 is completely engaged.

When the engine clutch 30 is engaged, the controller 300 performs the SB through the TCU 140 until completing the shifting at step S270.

The controller 300 may set a target speed of the engine 10 based on the motor speed and a rising slope of the motor speed during the SB.

When supplying the engine clutch 30 with hydraulic pressure to engage the engine clutch 30, the hydraulic pressure for engaging the engine clutch 30 and inertia of the engine have a negative influence on the downshift. Accordingly, the controller 300 may compensate a release hydraulic pressure for the shifting based on the engagement hydraulic pressure of the engine clutch, the motor speed, and a slope of the motor speed. In this case, the controller 300 may compensate the release hydraulic pressure after the engine speed and the motor speed are synchronized.

Therefore, according to various embodiments of the present invention, it is possible to engage the engine clutch during the SB on the kick-down occurring while the hybrid vehicle is running in the EV mode.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method of controlling a downshift for a hybrid vehicle, comprising:
    determining whether a running mode of the hybrid vehicle is an electric vehicle (EV) mode;
    determining whether a kick-down occurs when the hybrid vehicle is in the EV mode, wherein the kick-down requires a downshift;
    operating an engine and performing a shift-start (SS) when a downshift condition according to the kick-down is satisfied;
    determining whether a speed of the engine and a speed of a motor are synchronized before performing an actual shift-begin (SB);
    engaging an engine clutch when the speed of the engine and the speed of the motor are synchronized;
    performing the actual SB when the engine clutch is engaged; and
    compensating a release hydraulic pressure for shifting between the SS and the actual SB based on an engagement hydraulic pressure of the engine clutch, the motor speed, and a slope of the motor speed.

2. The method of claim 1, wherein the compensating of the release hydraulic pressure is performed after the engine speed and the motor speed are synchronized.

3. A method of controlling a downshift for a hybrid vehicle, comprising:
    determining whether a running mode of the hybrid vehicle is an electric vehicle (EV) mode;
    determining whether a kick-down occurs when the hybrid vehicle is in the EV mode, wherein the kick-down requires a downshift;
    operating an engine and performing a shift start (SS) and an actual shift begin (SB) when a downshift condition according to the kick-down is satisfied;
    determining whether a speed of the engine and a speed of a motor are synchronized during the actual SB;
    engaging an engine clutch when the speed of the engine and the speed of the motor are synchronized;
    performing actual shifting to terminate an operation of the downshift when the engine clutch is engaged; and
    setting a target speed of the engine based on the motor speed and a slope of the motor speed during the actual SB.

4. The method of claim 3, further comprising compensating a release hydraulic pressure for operation of the downshift based on an engagement hydraulic pressure of the engine clutch, the motor speed, and a slope of the motor speed.

5. The method of claim 4, wherein the compensating of the release hydraulic pressure is performed after the engine speed and the motor speed are synchronized.

* * * * *